United States Patent
Syska (10) Patent No.: US 10,408,197 B2
(45) Date of Patent: Sep. 10, 2019

(54) AXIAL PISTON PUMP/MOTOR

(71) Applicant: ROLLS-ROYCE PLC, London (GB)

(72) Inventor: Andrew Syska, Solihull (GB)

(73) Assignee: ROLLS-ROYCE plc, London (GB)

( * ) Notice: Subject to any disclaimer, the term of this patent is extended or adjusted under 35 U.S.C. 154(b) by 152 days.

(21) Appl. No.: 15/468,569

(22) Filed: Mar. 24, 2017

(65) Prior Publication Data

US 2017/0342970 A1 Nov. 30, 2017

(30) Foreign Application Priority Data

May 26, 2016 (GB) .................................. 1609351.0

(51) Int. Cl.
| | |
|---|---|
| F04B 1/12 | (2006.01) |
| F02C 7/22 | (2006.01) |
| F04B 1/20 | (2006.01) |
| F03C 1/06 | (2006.01) |
| F04B 35/04 | (2006.01) |

(52) U.S. Cl.
CPC ................ F04B 1/122 (2013.01); F02C 7/22 (2013.01); F03C 1/0623 (2013.01); F04B 1/2014 (2013.01); F04B 1/2021 (2013.01); F04B 1/2042 (2013.01); F04B 35/045 (2013.01); F05D 2240/55 (2013.01)

(58) Field of Classification Search
CPC ...... F04B 1/122; F04B 35/045; F04B 1/2042; F04B 1/2014; F04B 1/2021; F04B 1/2007; F02C 7/22; F03C 1/0623; F05D 2240/55
See application file for complete search history.

(56) References Cited

U.S. PATENT DOCUMENTS

| | | | | |
|---|---|---|---|---|
| 3,043,233 A | * | 7/1962 | Rumsey ................ | F03C 1/0444 251/172 |
| 3,092,036 A | * | 6/1963 | Creighton ............. | F01B 3/0055 91/485 |
| 3,523,678 A | * | 8/1970 | Wright .................. | F04B 1/2042 251/172 |
| 3,752,053 A | | 8/1973 | Wouters et al. | |
| 4,019,425 A | * | 4/1977 | Matzelle ............... | F04B 1/2042 91/487 |

(Continued)

FOREIGN PATENT DOCUMENTS

| | | | |
|---|---|---|---|
| DE | 3838801 | * | 5/1990 |
| EP | 2679818 | * | 1/2014 |
| EP | 2679818 A1 | * | 1/2014 |

(Continued)

*Primary Examiner* — Charles G Freay
(74) *Attorney, Agent, or Firm* — Oliff PLC (57) ABSTRACT

An axial piston pump has a rotor rotatable around an axis relative to a swashplate; one or more pistons movable within one or more respective sleeves; a fluid inlet port for the inflow of low pressure fluid, and a fluid outlet port for the outflow of high pressure fluid; and a floating element axially positioned between, on the one side, the inlet and outlet ports and, on the other side, a sealing surface of the rotor. Surfaces of the floating element defining an inlet chamber and the outlet chamber are configured such that, in use, the low pressure fluid and the high pressure fluid act on the defining surfaces to produce a net axial force which the axially slidable floating element applies to the rotor to seal the floating element to the sealing surface of the rotor.

9 Claims, 8 Drawing Sheets

(56) References Cited

U.S. PATENT DOCUMENTS

| | | | | |
|---|---|---|---|---|
| 4,793,239 A | * | 12/1988 | Eickmann | B64C 29/00 |
| | | | | 91/485 |
| 2015/0192075 A1 | * | 7/2015 | Griffiths | F01D 19/00 |
| | | | | 60/39.281 |

FOREIGN PATENT DOCUMENTS

| GB | 1016041 A | | 1/1966 |
|---|---|---|---|
| GB | 1148000 A | | 4/1969 |
| GB | 1165150 A | | 9/1969 |
| WO | WO 2004/042229 | * | 5/2004 |
| WO | WO 2008/071374 | * | 6/2008 |

* cited by examiner

AXIAL PISTON PUMP/MOTOR

FIELD OF THE INVENTION

The present invention relates to an axial piston pump and an axial piston motor. Particularly the present invention relates to an axial piston pump or motor utilizing a floating element to aid sealing.

BACKGROUND

Axial piston pumps can be used in aeroengine fuel control systems, e.g. to provide pressurised fuel to actuate auxiliary engine devices such as variable vanes and bleed valves, and to provide additional fuel supply to the combustor at high burnt flow engine operating conditions. An example of an axial piston pump in such a control system is described in US 2015/0192075. In this system, a gear pump is used to supply high pressure fuel to the combustor, with an axial piston pump providing extra capacity for the auxiliary devises. During periods of high burnt flow demand, the axial piston pump can be used to augment the gear pump.

An axial piston pump is a positive displacement pump containing one or more pistons within a piston housing or rotor. The pump operates by rotation of the rotor and hence the piston(s) relative to a swashplate, also known as a cam plate, which is generally a flat disc angled relative to the piston(s) and the axis of rotation. The swashplate functions as a cam to transform rotational movement into reciprocal movement of the piston(s). Between the rotor and inlet and outlet ports of the pump an interface exists. Conventionally, two hardened, flat, high polished plates are forced together at this interface to form a seal between the rotor and the ports, one of the plates rotating with the rotor and the other being fixed. To achieve this seal, the pistons are carefully balanced against the hydrodynamic pressure of a lubricating fluid at the interface over a set of running conditions.

However, should the pump be taken outside of its normal operating window, there is a risk that a pressure distribution generated in the lubricating film (generally a few microns thick) between the rotating and fixed plates (as a result of their relative movement) will be sufficient to force the two sealing plates apart and, for example, push the rotor away from the inlet and outlet ports. Any gap between the surfaces could allow expelled high pressure fluid intended for the pump outlet port to leak back into the pump inlet port, to the detriment of pump efficiency. Further, as the pressure in the region surrounding the outlet port in the fixed plate is generally greater than that surrounding the inlet port, the resultant pressure distribution may generate a moment which can induce a tilt in the rotating components and/or the fixed plate, if they are not adequately supported.

Similar issues also pertain to axial piston motors, which are essentially the same device operated in reverse so that high pressure fluid drives reciprocal movement of the pistons, which in turn produces rotation of the rotor.

SUMMARY

In general terms, the invention provides an axial piston pump or an axial piston motor having a floating element which is configured to move axially and is configured such that, in use, a pressure is applied against the rotor.

Accordingly, in a first aspect, the present invention provides an axial piston pump having:
- a rotor, which is rotatable around an axis relative to a swashplate;
- one or more pistons movable within one or more respective sleeves, the piston(s) and sleeve(s) being carried by the rotor and the piston(s) being engaged with the swashplate such that rotation of the rotor relative to the swashplate reciprocates the piston(s) in the sleeve(s) for the pressurisation of fluid received into and discharged from the sleeve(s);
- a fluid inlet port for the inflow of low pressure fluid, and a fluid outlet port for the outflow of high pressure fluid; and
- a floating element axially positioned between, on the one side, the inlet and outlet ports and, on the other side, a sealing surface of the rotor, the floating element being axially slidable, and at least partially defining an inlet chamber and an outlet chamber of the pump, wherein the inlet chamber fluidly connects the inlet port to the or each sleeve when that sleeve is rotated by the rotor to a position to receive low pressure fluid, and the outlet chamber fluidly connects the outlet port to the or each sleeve when that sleeve is rotated by the rotor to a position to discharge high pressure fluid;
- wherein surfaces of the floating element defining the inlet chamber and the outlet chamber are configured such that, in use, the low pressure fluid and the high pressure fluid act on the defining surfaces to produce a net axial force which the axially slidable floating element applies to the rotor to seal the floating element to the sealing surface of the rotor.

Advantageously, the net axial force produced in this way allows the floating element to adaptively seal to the sealing surface of the rotor according to the operating conditions of the axial piston pump. In particular, as the fluid pressure increases (i.e. higher volumes are pumped) and hydrodynamic pressure at the sealing surface interface correspondingly increases, the net axial force opposing the opening up of the interface also increases.

The axial piston pump may be a fuel pump, i.e. the fluid may be fuel. Thus in a second aspect, the invention provides an engine fuel control system having the axial piston pump of the first aspect, the axial piston pump being arranged to deliver pressurised fuel to one or more fuel-pressure operated auxiliary engine devices.

In a third aspect, the invention provides a gas turbine engine (e.g. an aeroengine) having one or more fuel-pressure operated auxiliary engine devices (e.g. variable vanes and/or bleed valves), and the engine fuel control system of the second aspect.

In a fourth aspect, the present invention provides an axial piston motor having:
- a rotor, which is rotatable around an axis relative to a swashplate;
- one or more pistons movable within one or more respective sleeves, the piston(s) and sleeve(s) being carried by the rotor and the piston(s) being engaged with the swashplate such that pressurised fluid received into and discharged from the sleeve(s) reciprocates the piston(s) in the sleeve(s) to rotate the rotor relative to the swashplate;
- a fluid inlet port for the inflow of high pressure fluid, and a fluid outlet port for the outflow of low pressure fluid; and
- a floating element axially positioned between, on the one side, the inlet and outlet ports and, on the other side, a sealing surface of the rotor, the floating element being axially slidable, and at least partially defining an inlet chamber and an outlet chamber of the motor, wherein the inlet chamber fluidly connects the inlet port to the or each sleeve when that sleeve is at a rotation position of the rotor to receive high pressure fluid, and the outlet chamber fluidly connects the outlet port to the or each sleeve when that sleeve is at a rotation position of the rotor to discharge low pressure fluid;

wherein surfaces of the floating element defining the inlet chamber and the outlet chamber are configured such that, in use, the high pressure fluid and the low pressure fluid act on the defining surfaces to produce a net axial force which the axially slidable floating element applies to the rotor to seal the floating element to the sealing surface of the rotor.

Thus the axial piston motor of the fourth aspect corresponds to the axial piston pump of the first aspect. In the axial piston motor, the fluid may be any suitable hydraulic fluid.

Optional features of the invention will now be set out. These are applicable singly or in any combination with any aspect of the invention.

Typically, the floating element is radially and circumferentially fixed with respect to the axis of rotation.

The floating element may form a sliding interface directly with the sealing surface of the rotor. However, another option is for the pump to further have a port plate axially positioned between, on the one side, the floating element and, on the other side, the sealing surface of the rotor, the port plate having a port plate inlet which extends the inlet chamber to the sealing surface of the rotor, and a port plate outlet which extends to the outlet chamber from the sealing surface of the rotor, the port plate being axially movable with the floating element and mediating the application of the net axial force to the rotor by the floating element. Conveniently, the port plate can then form a sliding interface with the sealing surface of the rotor. Typically, the port plate is also radially and circumferentially fixed with respect to the axis of rotation. Advantageously, this option relieves the floating element of the need to withstand the friction generated between the rotating and static elements at the sliding interface. The floating element, which is typically more complexly shaped than the port plate, can thus be formed of a material which, although it has reduced wear resistance, is relatively easy to shape.

The defining surfaces of the floating element may be configured such that the net axial force exceeds an opposing interfacial hydrodynamic force produced at the sealing surface of the rotor by its rotation. By slightly exceeding the interfacial hydrodynamic force, the floating element can be kept in a loaded state against the rotor which maintains the duty of the sliding interface while avoiding overloading. The defining surfaces may be configured such that the net axial force exceeds the opposing interfacial hydrodynamic force for all normal operating conditions of the pump/motor.

In the pump, the outlet chamber may have at least one surface which faces away from the rotor such that the high pressure fluid pumped through the outlet chamber contributes at least a portion of the net axial force applied to the rotor. Similarly, in the motor the inlet chamber may have at least one surface which faces away from the rotor such that the high pressure fluid pumped received through the inlet chamber contributes at least a portion of the net axial force applied to the rotor.

In the pump, the fluid connection of the outlet chamber to the outlet port may be radially offset from the axis of rotation. Similarly, in the motor, the fluid connection of the inlet chamber to the inlet port may be radially offset from the axis of rotation. This can produce a moment at the sealing surface of the rotor which helps to balance any opposing moment produced by a pressure difference at the sealing surface due to its fluid communication with high pressure fluid in some of the sleeves and low pressure fluid in other of the sleeves. Left unbalanced, the latter moment can cause component tilting and hence leakage at the sealing surface.

Conveniently, in the pump, the inlet chamber may substantially surround the outlet chamber. Similarly, in the motor, the outlet chamber may substantially surround the inlet chamber. This can improve the compactness of the pump/motor. For example, the surrounding chamber may form an annulus around the other chamber.

The axial piston pump/motor may further have a spring element which provides a further axial force urging the floating element towards the rotor or the rotor towards the floating element. In this way, a force can be applied to the rotor during start-up of the axial piston pump/motor, e.g. when the inlet or outlet fluid pressure are typically zero, to prevent the rotor moving away from the floating element.

The axial piston pump/motor may further have a stop, e.g. in the form of a thrust bearing, which acts on the rotor to prevent the rotor moving axially away from the floating element beyond a predetermined axial position.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
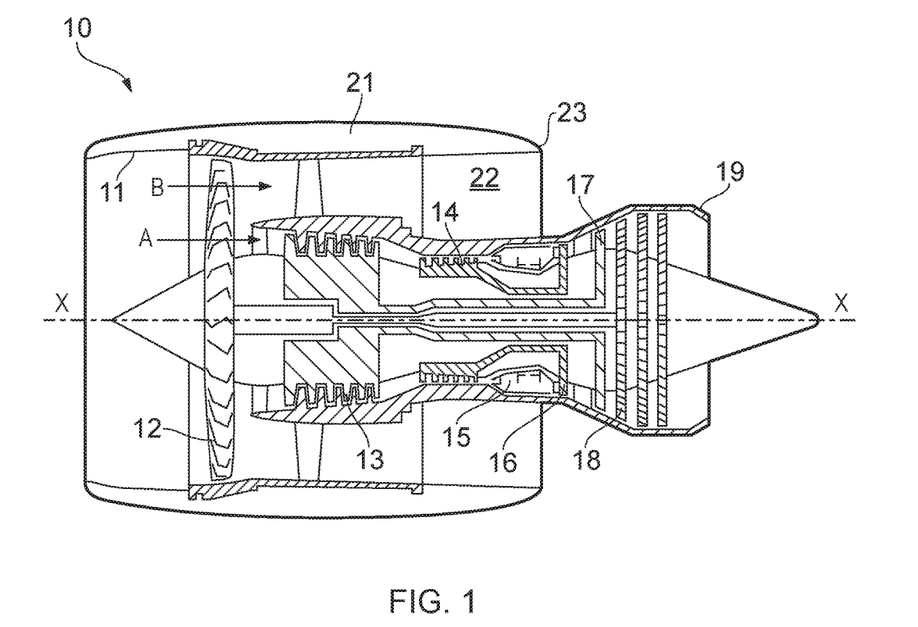
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2:
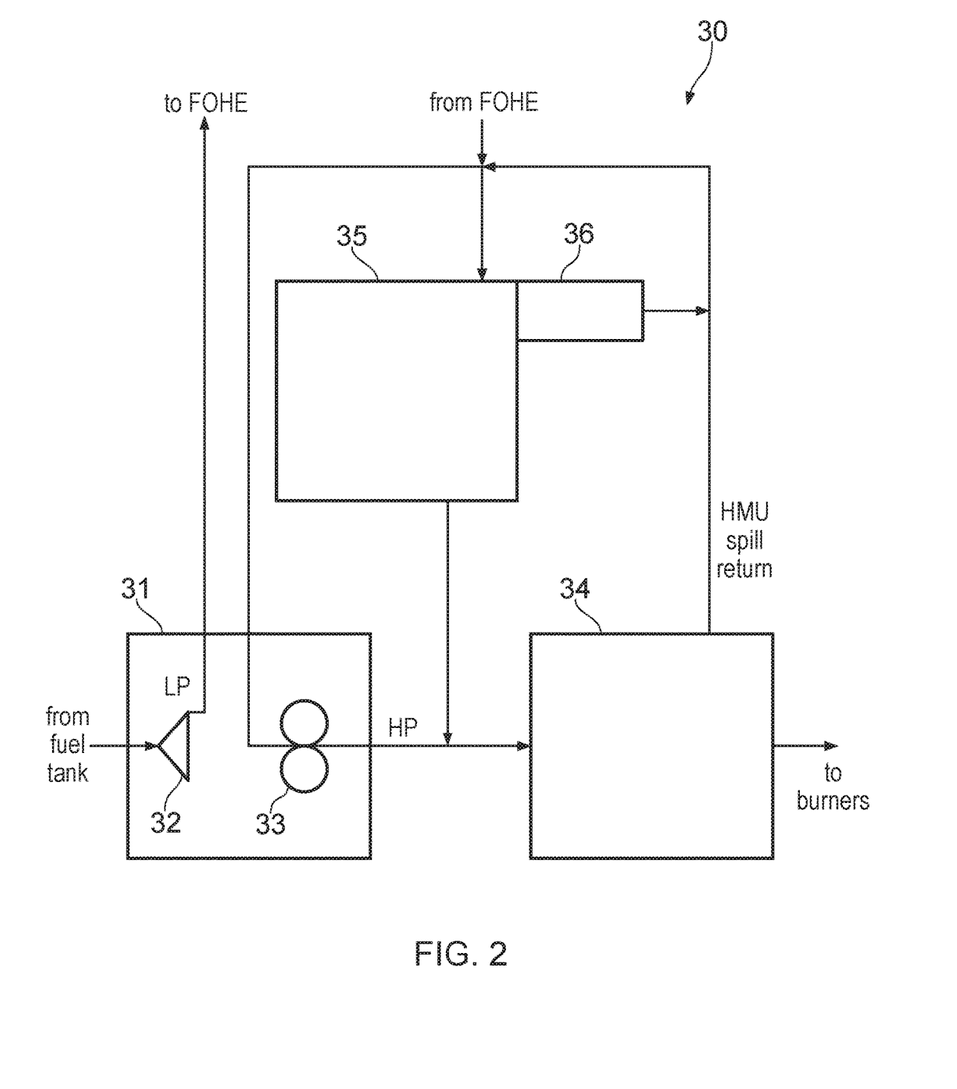
FIG. 2 shows schematically a fuel control system of the engine of FIG. 1.

A fuel control system 30 of the engine, shown schematically in FIG. 2, has a main pump unit 31 comprising a low pressure (LP) pump 32 which draws fuel from a fuel tank of the aircraft and supplied the fuel at boosted pressure LP to the inlet of a high pressure (HP) fixed displacement pump 33. The inter-stage flow between the LP and HP pumping stages is typically used to cool engine lubrication oil in a fuel/oil heat exchanger (FOHE).

The HP pump 33 feeds HP fuel to a hydro-mechanical unit (HMU) 34 of the fuel control system, the hydro-mechanical unit controlling the rate at which fuel is allowed to flow to burners of the engine. Not all the HP fuel exiting the HP pump 33 may be burnt in the engine. A substantial proportion may be recirculated back to the pump unit 31 via a spill return of the HMU.

The fuel control system also has an actuator pump unit 35 which receives a portion of the LP fuel from the FOHE mixed with the fuel from the HMU spill return.

The actuator pump unit 35 contains an axial piston pump which pressurises the LP fuel to a high pressure. The pressurised fuel is then delivered to fuel-pressure operated auxiliary devices 36, such as actuator servo-valves for variable stator vanes, variable inlet guide vanes and bleed valves. Thereafter the pressurised fuel is sent to the HMU spill return. The actuator pump unit also allows the axial piston pump to combine with the HP pump to deliver fuel to the HMU 34, and thence the burners.

Figure 3:
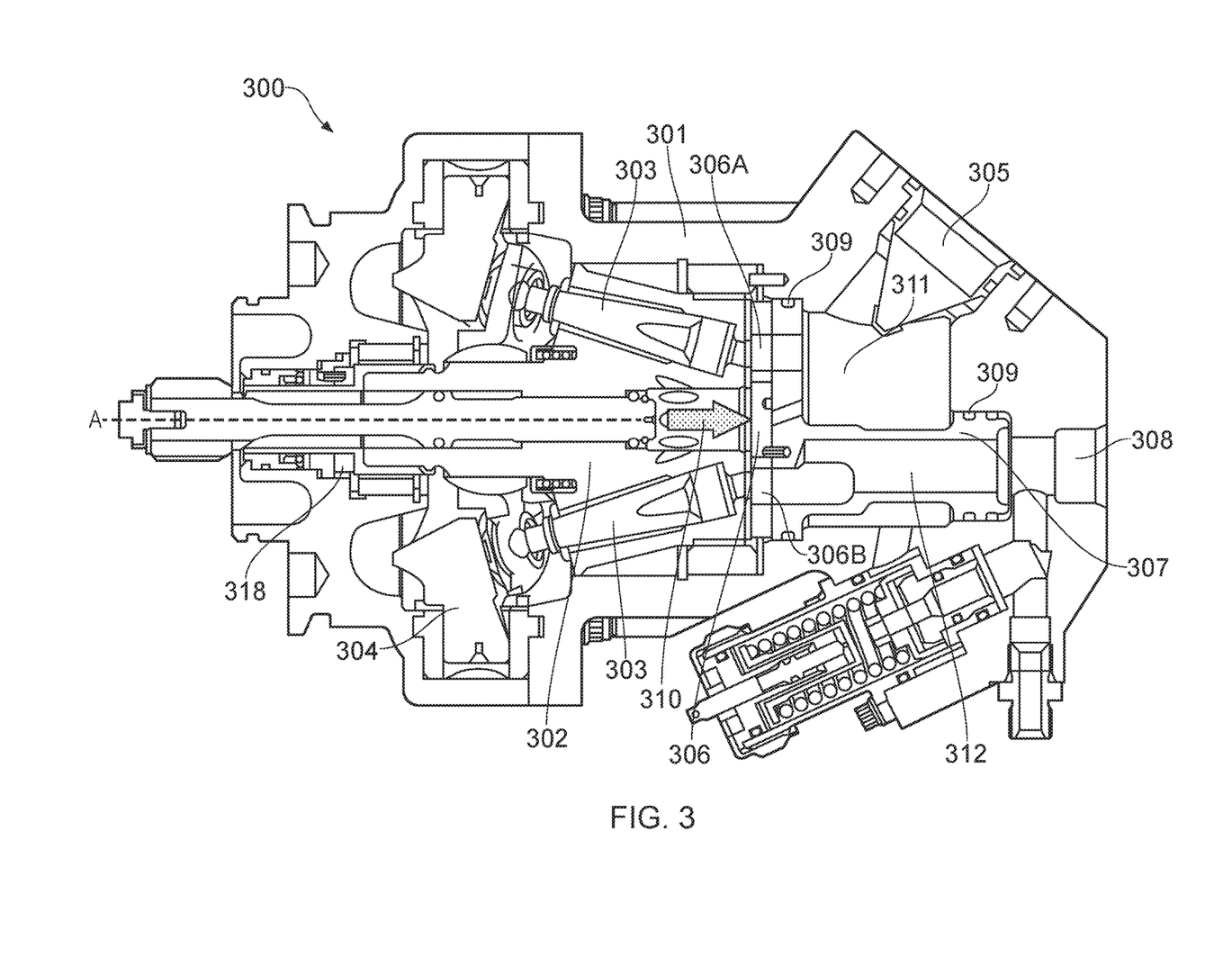
FIG. 3 shows a cross-section through an axial piston pump of the fuel control system of FIG. 2.

With reference to FIG. 3, the axial piston pump of the fuel control system 30 is generally indicated by 300. The axial piston pump 300 has a main chassis 301, within which is a rotor 302 which carries a number of pistons 303 within respective piston sleeves. The rotor 302 rotates around an axis of rotation A and may be driven by, for example, an auxiliary drive shaft of the engine 10. At one end of the rotor 302 is a swashplate 304, having a cam surface which is angled relative to the axis of rotation A. At an opposite end of the rotor 302 to the swashplate 304, a sealing surface of the rotor 302 forms an interface with an axially slidable and non-rotating port plate 306. This in turn is adjacent to a floating element 307 which is axially slidable with the port plate 306 to substantially prevent internal leakage. In a typical application, the maximum extent that the port plate 306 and the floating element 307 might slide axially may be around 1 mm, but this can vary dependent on pump configuration and application. The rotor is prevented from moving axially away from the port plate 306 and the floating element by a thrust bearing 318 which provides a backstop against axial movement.

The port plate 306 and the floating element 307 are radially and circumferentially fixed, so that they cannot move radially with respect to, nor rotate around, the axis of rotation A. The floating element 307 and the main chassis 301 define an inlet chamber 311 which fluidly connects an inlet port 305 of the pump with an inlet 306A of the port plate 306. The floating element 307 also fluidly connects an outlet port 308 of the pump with an outlet 306B of the port plate 306 through an outlet chamber 312. The inlet 306A and outlet 306B of the port plate 306 align with the piston sleeves, such that when the rotor 302 rotates around A, the pistons 303 undergo reciprocating motion thereby drawing fluid into each piston sleeve in turn from the inlet 306A and expelling pressurised fluid out of each piston sleeve in turn into the outlet 306B.

The outlet chamber 312 is fluidly isolated from the inlet port 305 via seal 309. Therefore the only way in which fluid should move from the inlet port 305 to the outlet port 308 is via the piston sleeves in the rotor 302. In use, due to a thin layer of lubricating fluid at the interface of the sealing surface of the rotor 302 and the port plate 306, the rotor 302 imparts a hydrodynamic force 310 onto the port plate 306 urging the port plate away from the rotor.

Figure 4A:
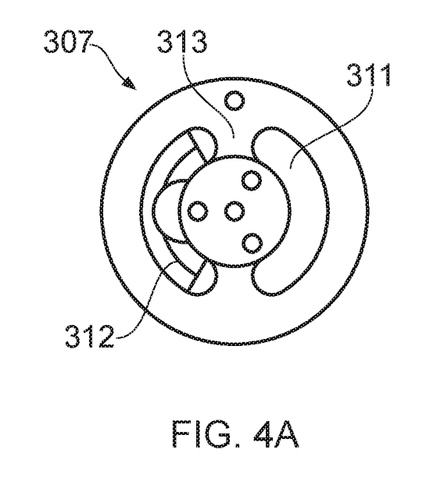
FIGS. 4A-4D show various perspective views of a floating element included in the axial piston pump of FIG. 3.
Figure 4B:
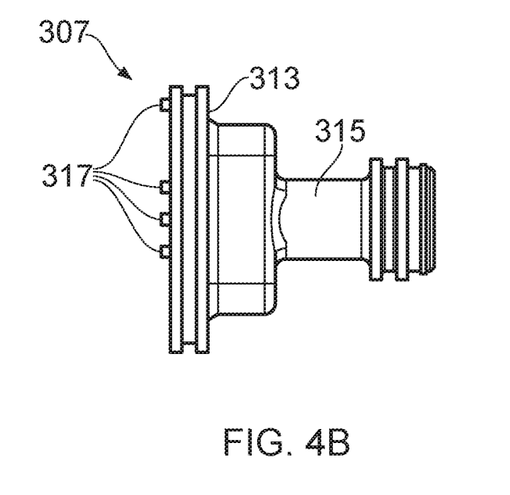

FIGS. 4A-4D shows a number of perspective views of the floating element 307. FIG. 4A shows a front-on view of the floating element 307, the inlet chamber 311 forms here a semi-annular hole in a plate portion 313 of the floating element, the plate portion 313 being the part of the floating element which makes contact with the port plate 306. The outlet chamber 312 forms a semi-annular hole on the radially opposite side of the plate 313 and also extends rearwards therefrom as a bore of a projecting portion 315 of the floating element 307. FIG. 4B shows the projecting portion 315 extending axially from the plate portion 313 on a side-on view of the floating element 307. Pins 317 on the front face of the plate portion 313 mate with corresponding holes formed in the port plate 306 to prevent relative radial and circumferential motion of the floating element and the port plate. More particularly, the three centre pins act as a spigot to centre the port plate on the floating element and the single outer pin is to prevent relative rotation of the port plate and the floating element.

Figure 4C:
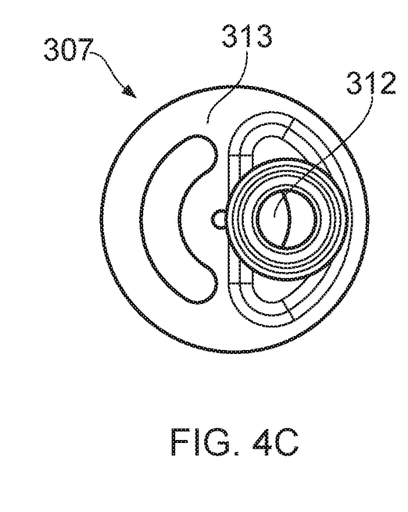
Figure 4D:
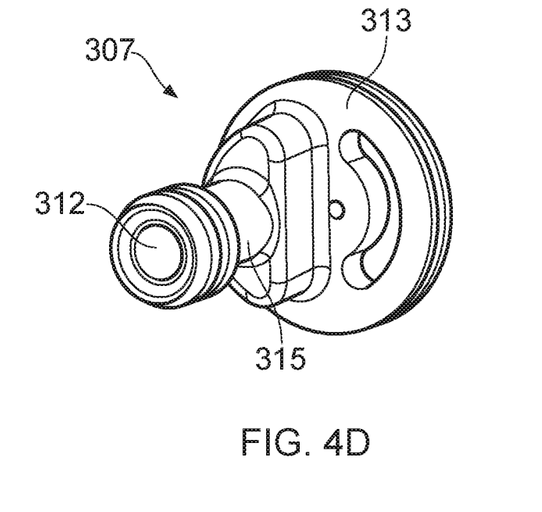

FIGS. 4C and 4D show respectively end-on and perspective views of the floating element 307. The projecting portion 315 (and therefore the rearwards extending bore of the outlet chamber 312) is radially offset from the centre of the plate portion 313.

Figure 5:
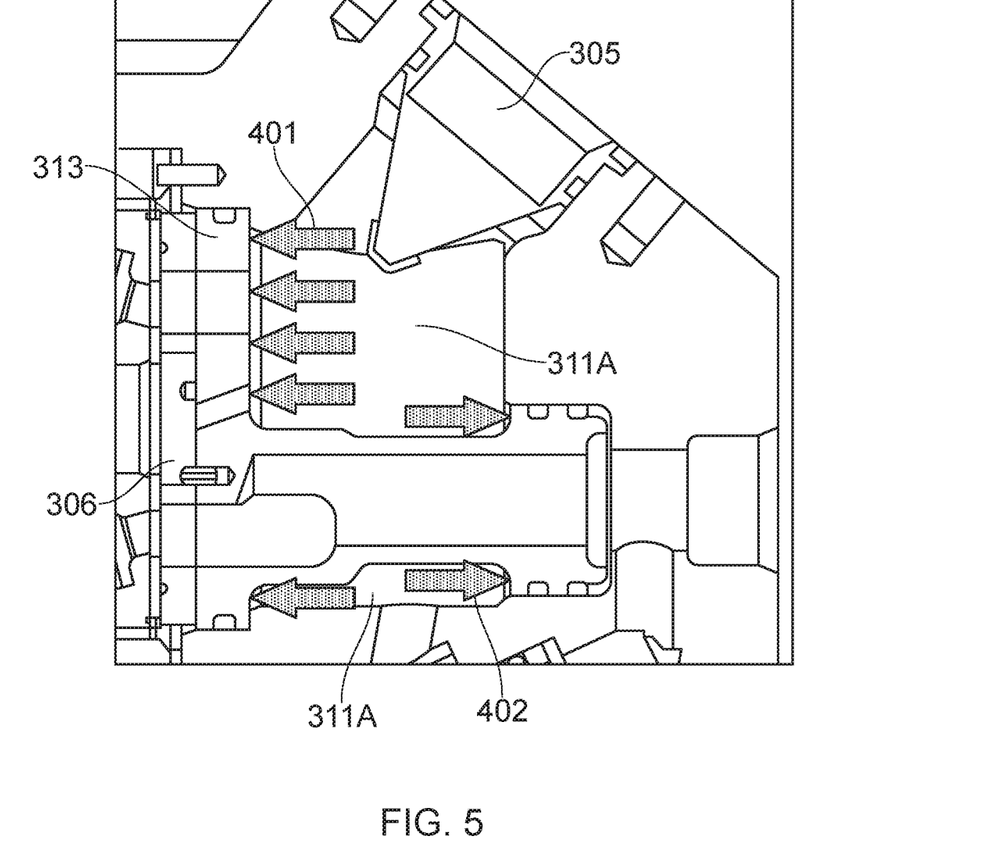
FIG. 5 is an enlarged cross-section of the axial piston pump of FIG. 3.

Moving to FIG. 5, this shows an enlarged view of the axial piston pump of FIG. 3. The enlarged view shows more clearly the inlet port 305, which feeds fluid into the inlet chamber 311. The inlet chamber has an ante-chamber portion 311A which is partially bounded by the plate 313 of the floating element 307, the ante-chamber portion surrounding the projecting portion 315 of the floating element, and hence the outlet chamber 312. As low pressure fluid enters the ante-chamber portion from the inlet port 305, it exerts an inlet fluid pressure on the plate 313 indicated by the leftward-pointing arrows 401. Because of the contact between and axial slidability of the floating element and the port plate 306, this pressure imparts a force to seal the floating element to the sealing surface of the rotor 302.

The floating element 307 may have some surfaces defining the inlet chamber 311 facing towards the plate 313, for example, some of the outer surfaces of the projecting portion 315 face this way. The fluid pressure 402 (indicated by rightward-pointing arrows) acting on these surfaces imparts a (generally smaller) force which acts to move the floating element away from the rotor 302. The net force produced by the action of the low pressure inlet fluid acting on the floating element can thus be varied by varying the relative configurations (i.e. shape and/or dimension) of these surfaces.

Figure 6:
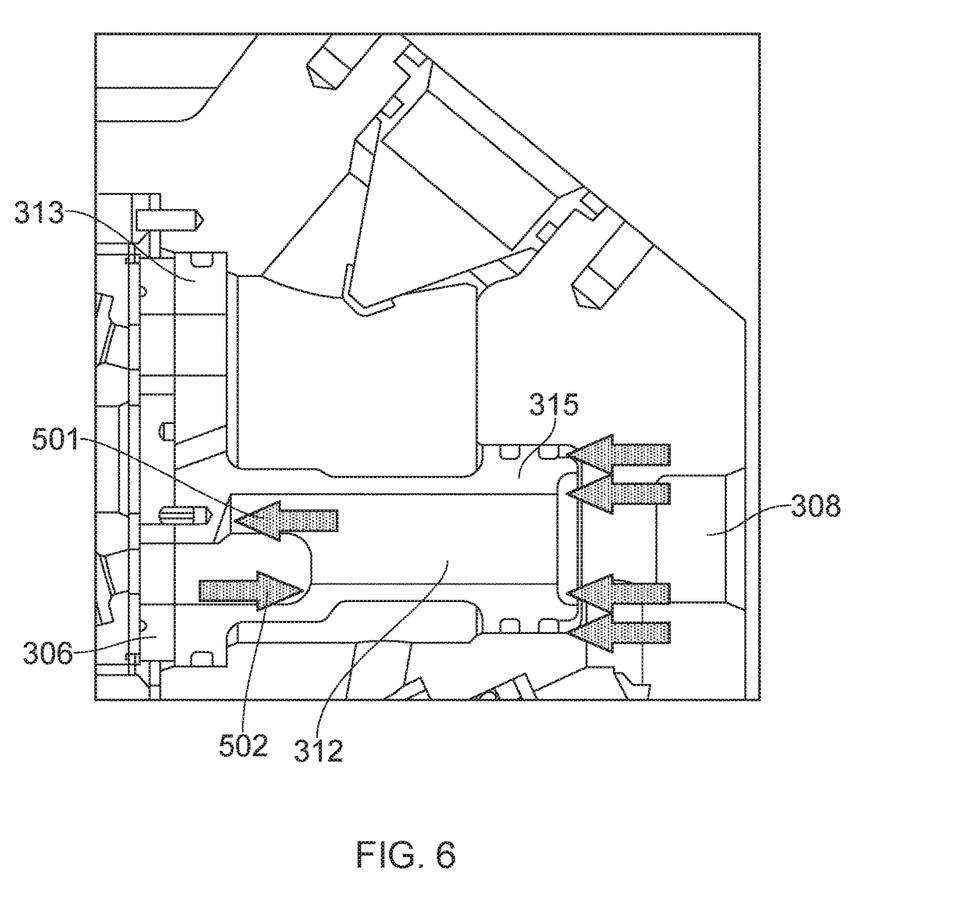
FIG. 6 is an enlarged cross-section of the axial piston pump of FIG. 3.

FIG. 6 is similar to FIG. 5, except that it shows the effects of the high pressure outlet fluid rather than the low pressure inlet fluid. The outlet fluid pressure 501 (indicated by leftward-pointing arrows) acting on surfaces of the floating element 307 which face away from the rotor 302 imparts a force to move the floating element towards the rotor. A generally smaller counterforce is imparted by the outlet fluid pressure 502 (indicated by rightward-pointing arrows) acting on surfaces which face the other way. Again, the net force produced by the action of the high pressure outlet fluid acting on the floating element can thus be varied by varying the relative configurations of these surfaces.

Figure 7:
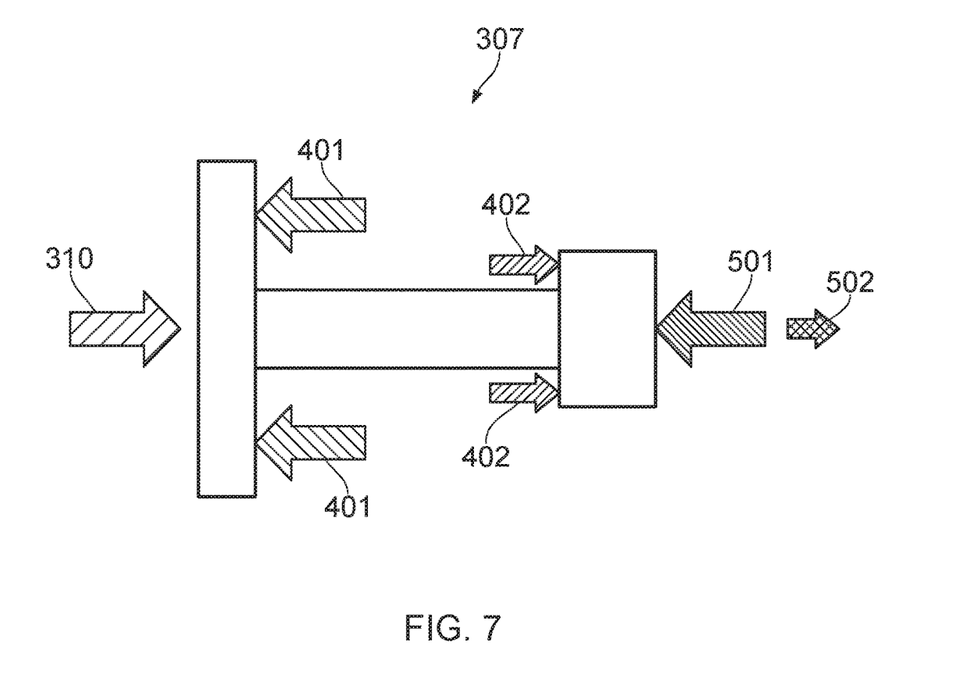
FIG. 7 is a simplified force-diagram showing forces applied to and by a floating element of an axial piston pump.

FIG. 7 depicts a simplified force diagram, summarising some of the various forces applied when the axial piston pump is in use. As discussed above, as the rotor 302 rotates it imparts a hydrodynamic force 310 towards the port plate 306 and the floating element 307. Fluid enters the pump 300 at a low pressure and leaves the pump at a high pressure. The resultant forces on the floating element produced by these pressures may be varied by altering the configurations of the surfaces of the floating element defining the inlet chamber 311 and the outlet chamber 312. Advantageously, by appropriate configuration of the floating element, the overall net axial force of the fluid pressures 401 and 501 acting towards the rotor and the fluid pressures 402 and 502 acting away from the rotor can be set such that it slightly exceeds the hydrodynamic force 310 for all normal operating conditions of the pump. That is, because the hydrodynamic force is substantially proportional to the inlet and outlet pressures and hence to the overall net axial force of the fluid pressures, as pressure in the pump increases, the forces remain balanced to maintain the correct film thickness at the sliding interface between the sealing surface of the rotor and the port plate. In this way, the duty of the sliding interface can be maintained, while avoiding overloading.

Figure 8:
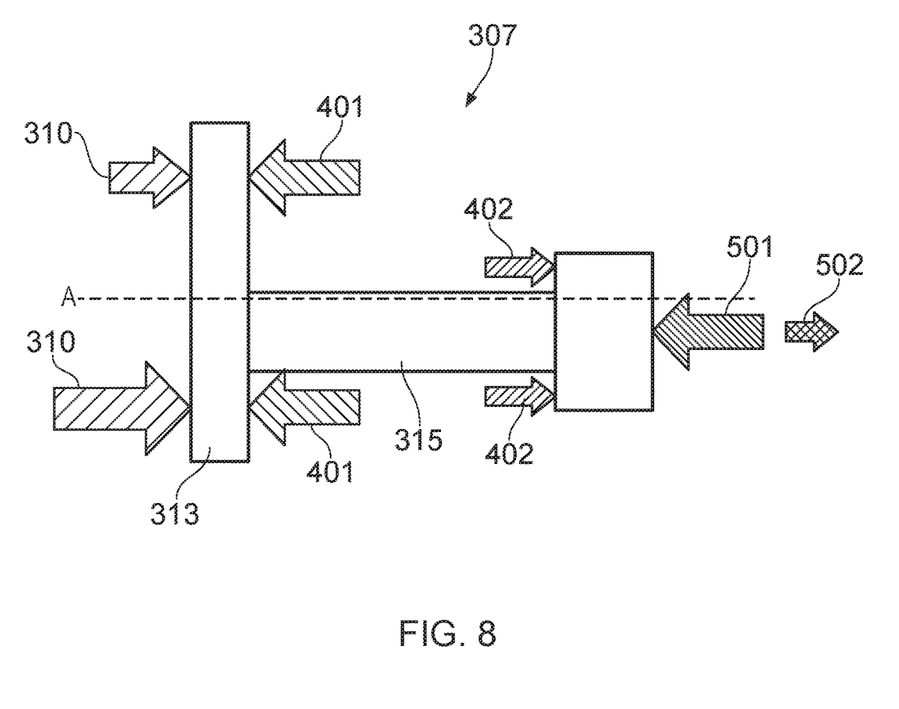
FIG. 8 is a simplified force-diagram showing forces applied to and by a variant floating element.

FIG. 8 is similar to FIG. 7 in that it depicts a simplified force diagram. However in this case the projecting portion 315 of the floating element 307 is radially offset from the axis of rotation A, which coincides with the centre of the plate 313. This configuration better aligns the bore of the projecting portion with the port plate outlet 306B, and is also the configuration shown in FIGS. 3-6. In addition, the hydrodynamic force 310 is represented by two block arrows, the higher force being at the outlet side of the plate 313. This uneven force distribution is generated by the greater fluid pressure in the piston sleeves linked to the pump outlet chamber 312 than in those linked to the inlet chamber 311. It is also generated by the relative rotation at the sliding interface of the rotor sealing surface and the port plate. The uneven forces produce a moment around the plate 313, which left unchecked, could tilt the floating element, causing leakage across the sliding interface. However, the radial offsetting of the projecting portion 315 advantageously results in the outlet fluid pressure producing a force 501 which produces a counteracting moment. Indeed, the degree of radial offset can be set so as to generate opposing and balancing moments around the plate 313.

While the invention has been described in conjunction with the exemplary embodiments described above, many equivalent modifications and variations will be apparent to those skilled in the art when given this disclosure. For example, at start-up of the piston pump the fluid pressures in the inlet chamber 311 and the outlet chamber 312 are typically zero. Thus to prevent the rotor 302 moving away from the port plate 306 and the floating element 307, a spring element may be provided to urge the port plate and floating element towards the rotor or vice versa. More generally, the above description relates to an axial piston pump, but an axial piston motor may also be provided having similar features, the motor essentially being the same device but operated in reverse so that high pressure fluid drives reciprocal movement of the pistons, which in turn produces rotation of the rotor. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. An axial piston pump having:
   a rotor, which is rotatable around an axis relative to a swashplate;
   one or more pistons movable within one or more respective sleeves, the piston(s) and sleeve(s) being carried by the rotor and the piston(s) being engaged with the swashplate such that rotation of the rotor relative to the swashplate reciprocates the piston(s) in the sleeve(s) for the pressurisation of fluid received into and discharged from the sleeve(s);
   a fluid inlet port for the inflow of low pressure fluid, and a fluid outlet port for the outflow of high pressure fluid; and
   a floating element axially positioned between, on one side, the inlet and outlet ports and, on another side, a sealing surface of the rotor, the floating element being axially slideable and at least partially defining an inlet chamber and an outlet chamber of the pump, wherein the inlet chamber fluidly connects the inlet port to the or each sleeve when that sleeve is rotated by the rotor to a position to receive low pressure fluid, the outlet chamber fluidly connects the outlet port to the or each sleeve when that sleeve is rotated by the rotor to a position to discharge high pressure fluid, and the inlet chamber substantially surrounds the outlet chamber;
   wherein surfaces of the floating element defining the inlet chamber and the outlet chamber are configured such that, in use, the low pressure fluid and the high pressure fluid act on the defining surfaces to produce a net axial force which the axially slidable floating element applies to the rotor to seal the floating element to the sealing surface of the rotor;
   wherein the axial piston pump further has a port plate axially positioned between, on a first side, the floating element and, on a second side, the sealing surface of the rotor, the port plate having a port plate inlet which extends the inlet chamber to the sealing surface of the rotor, and a port plate outlet which extends to the outlet chamber from the sealing surface of the rotor the port plate being axially movable with the floating element and mediating the application of the net axial force to the rotor by the floating element; and
   wherein a fluid connection of the outlet chamber to the outlet port is radially offset from the axis of rotation.

2. The axial piston pump of claim 1, wherein the defining surfaces of the floating element are configured such that the net axial force exceeds an opposing interfacial hydrodynamic force produced at the sealing surface of the rotor by its rotation.

3. The axial piston pump of claim 1, wherein the outlet chamber has at least one surface which faces away from the rotor such that the high pressure fluid pumped through the outlet chamber contributes at least a portion of the net axial force applied to the rotor.

4. The axial piston pump of claim 1, further having a spring element which provides a further axial force urging the floating element towards the rotor or the rotor towards the floating element.

5. An engine fuel control system having an axial piston pump of claim 1, the axial piston pump being arranged to deliver pressurised fuel to one or more fuel-pressure operated auxiliary engine devices.

6. A gas turbine engine having one or more fuel-pressure operated auxiliary engine devices, and the engine fuel control system of claim 5.

7. An axial piston motor having:
a rotor, which is rotatable around an axis relative to a swashplate;
one or more pistons movable within one or more respective sleeves, the piston(s) and sleeve(s) being carried by the rotor and the piston(s) being engaged with the swashplate such that pressurised fluid received into and discharged from the sleeve(s) reciprocates the piston(s) in the sleeve(s) to rotate the rotor relative to the swashplate;
a fluid inlet port for the inflow of high pressure fluid, and a fluid outlet port for the outflow of low pressure fluid; and
a floating element axially positioned between, on one side, the inlet and outlet ports and, on another side, a sealing surface of the rotor, the floating element being axially slideable and at least partially defining an inlet chamber and an outlet chamber of the motor, wherein the inlet chamber fluidly connects the inlet port to the or each sleeve when that sleeve is at a rotation position of the rotor to receive high pressure fluid, the outlet chamber fluidly connects the outlet port to the or each sleeve when that sleeve is at a rotation position of the rotor to discharge low pressure fluid, and the outlet chamber substantially surrounds the inlet chamber;

wherein surfaces of the floating element defining the inlet chamber and the outlet chamber are configured such that, in use, the high pressure fluid and the low pressure fluid act on the defining surfaces to produce a net axial force which the axially slidable floating element applies to the rotor to seal the floating element to the sealing surface of the rotor;

wherein the axial piston motor further has a port plate axially positioned between, on a first side, the floating element and, on a second side, the sealing surface of the rotor, the port plate having a port plate inlet which extends the inlet chamber to the sealing surface of the rotor, and a port plate outlet which extends to the outlet chamber from the sealing surface of the rotor the port plate being axially movable with the floating element and mediating the application of the net axial force to the rotor by the floating element; and wherein a fluid connection of the inlet chamber to the inlet port is radially offset from the axis of rotation.

8. The axial piston motor of claim 7, wherein the defining surfaces of the floating element are configured such that the net axial force exceeds an opposing interfacial hydrodynamic force produced at the sealing surface of the rotor by its rotation.

9. The axial piston motor of claim 7, wherein the inlet chamber has at least one surface which faces away from the rotor such that the high pressure fluid received through the inlet chamber contributes at least a portion of the net axial force applied to the rotor.

* * * * *